(12) United States Patent
Miyake et al.

(10) Patent No.: US 8,399,598 B2
(45) Date of Patent: Mar. 19, 2013

(54) COPOLYCARBONATE AND PROCESS FOR PRODUCING THE SAME

(75) Inventors: Toshiyuki Miyake, Chiyoda-ku (JP); Masami Kinoshita, Chiyoda-ku (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 13/259,876

(22) PCT Filed: Apr. 16, 2009

(86) PCT No.: PCT/JP2009/058029
§ 371 (c)(1),
(2), (4) Date: Sep. 23, 2011

(87) PCT Pub. No.: WO2010/119574
PCT Pub. Date: Oct. 21, 2010

(65) Prior Publication Data
US 2012/0016100 A1   Jan. 19, 2012

(51) Int. Cl.
*C08G 64/00*   (2006.01)
*C08G 63/02*   (2006.01)

(52) U.S. Cl. ............. 528/196; 264/176.1; 264/219; 528/198; 528/271; 528/272; 528/402; 528/480

(58) Field of Classification Search ........... 264/176.1, 264/219; 528/196, 198, 271, 272, 480, 402
See application file for complete search history.

(56) References Cited

U.S. PATENT DOCUMENTS

| 4,506,066 A | 3/1985 | Medem et al. |
| 2006/0149024 A1 | 7/2006 | Ono et al. |
| 2010/0190953 A1 | 7/2010 | Fuji et al. |
| 2010/0196720 A1 | 8/2010 | Kato et al. |
| 2011/0003101 A1 | 1/2011 | Fuji et al. |

FOREIGN PATENT DOCUMENTS

| DE | 29 38 464 A1 | | 4/1981 |
| EP | 2033981 | * | 3/2009 |
| EP | 2033981 A1 | | 3/2009 |
| EP | 2053072 | * | 4/2009 |
| EP | 2354816 A1 | | 8/2011 |
| JP | 56-110723 A | | 9/1981 |
| JP | 2003-292603 A | | 10/2003 |
| JP | 2004-67990 A | | 3/2004 |
| JP | 2006-232897 A | | 9/2006 |
| JP | 2009-62501 A | | 3/2009 |
| JP | 2009-73892 A | | 4/2009 |
| JP | 2009-102536 A | | 5/2009 |
| WO | 2004/111106 A1 | | 12/2004 |
| WO | 2006/041190 A1 | | 4/2006 |
| WO | 2007/013463 A1 | | 2/2007 |
| WO | 2007/148604 A1 | | 12/2007 |
| WO | 2008/020636 A1 | | 2/2008 |
| WO | 2008/023715 A1 | | 2/2008 |
| WO | 2009/052463 A1 | | 4/2009 |
| WO | 2009/075304 A1 | | 6/2009 |

OTHER PUBLICATIONS

Braun et al.; 1,4:Dianhydrohexite als Bausteine fur Polymere; Journal Fuer Praktische Chemie; 1992; vol. 334, pp. 298-310.
Kricheldorf et al.; Polymers of Carbonic Acid. 22. Cholesteric Polycarbonates Derived from (S)-((2-Methylbutyl)thio)hydroquinone or Isosorbide; Macromolecules, 1996, vol. 29, pp. 8077-8082.
Okada et al.; Biodegradable Polymers. Based on Renewable Resources; Journal of Applied Polymer Science; 2002, vol. 86, pp. 872-880.
Kricheldorf et al,; Polymers of carbonic acid, 23.sup.a); Macromolecular Chemistry and Physics, 1997, vol. 198, pp. 2197-2210.
Kricheldorf et al.; Polymers of Carbonic Acid; Journal of Polymer Science: Part A; 1997, vol. 35, pp. 1611-1619.
Sun et al.; New Polymers of Carbonic Acid. XXV.; Journal of Polymer Science: Part A; 1999; vol. 37, pp. 1125-1133.
Yokoe et al.; Biodegradable Polymers Based on Renewable Resources. VII; Journal of Polymer Science: Part A; 2003, vol. 41, pp. 2312-2321.
Extended European Search Report dated Oct. 11, 2012, issued in Application No. 09843353.5.
Japanese Office Action for Corresponding Application 2007-276411 dispatched Sep. 4, 2012.

* cited by examiner

*Primary Examiner* — Terressa Boykin
(74) *Attorney, Agent, or Firm* — Sughrue Mion, PLLC

(57) ABSTRACT

The object of this invention is to provide a copolycarbonate that is excellent in heat resistance, thermal stability and moldability and that uses a renewable resource as a raw material. This invention is a copolycarbonate including 50 to 99 mol % of a carbonate constituent unit (1) of the following formula and 50 to 1 mol% of a carbonate constituent unit (2) derived from an aliphatic diol having a boiling point of 180° C. or higher under reduced pressure of $4 \times 10^{-3}$ MPa.

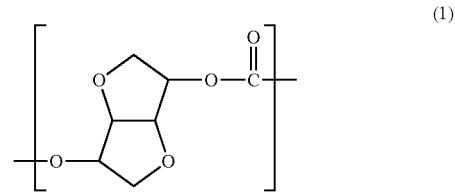

(1)

7 Claims, No Drawings

COPOLYCARBONATE AND PROCESS FOR PRODUCING THE SAME

CROSS REFERENCE TO RELATED APPLICATIONS

This application is a National Stage of International Application No. PCT/JP2009/058029 filed Apr. 16, 2009, the contents of which are incorporated herein by reference in their entirety.

TECHNICAL FIELD

This invention relates to a novel copolycarbonate and a process for producing the same. More specifically, this invention relates to a copolycarbonate that contains units derived from glycide as renewable resources and that is excellent in heat resistance, thermal stability and moldability. This invention also relates to a copolycarbonate useful as various molding materials or polymer alloy materials and a process for producing the same.

BACKGROUND ART

Polycarbonate refers to polymers formed by combining aromatic or aliphatic dioxycompounds with carbonate ester, and of these, a polycarbonate obtained from 2,2-bis(4-hydroxyphenyl)propane (so-called bisphenol A) is excellent in transparency, heat resistance and mechanical properties such as impact resistance, and it is used in many fields.

In general, polycarbonate is produced from raw materials obtained from petroleum resources, while there are concerns about depletion of petroleum resources, and it is demanded to produce polycarbonate from raw materials obtained from renewable resources such as plants. As biomass materials using renewable resources as raw materials, studies are being made of polycarbonates that use raw materials obtained from ether diol residues producible from glycide in addition to polylactic acid.

For example, an ether diol of the following formula (a) is easily produced from renewable resources such as sugars and starch, and three kinds of stereoisomers are known. Specifically, they are 1,4:3,6-dianhydro-D-sorbitol (to be referred to as "isosorbide" hereinafter in the present specification) represented by the following formula (a-1), 1,4:3,6-dianhydro-D-mannitol (to be referred to as "isomannide" hereinafter in the present specification) represented by the following formula (a-2), and 1,4:3,6-dianhydro-L-iditol (to be referred to as "isoidide" hereinafter in the present specification) represented by the following formula (a-3).

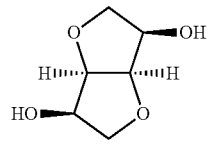

(a)

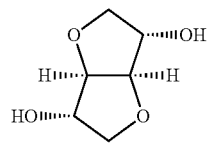

(a-1)

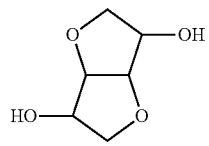

(a-2)

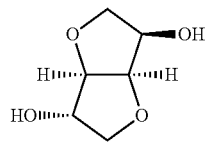

(a-3)

Isosorbide, isomannide and isoidide can be produced from D-glucose, D-mannose and L-idose, respectively. For example, isosorbide can be produced by hydrogenating D-glucose and then dehydrating it with an acid catalyst.

It has been heretofore studied to incorporate in particular isosorbide of the above ether diols into a polycarbonate as the main monomer (Patent Documents 1 to 2 and Non-Patent Documents 1 to 3). However, homopolycarbonates from isosorbide have a very high melt viscosity due to their rigid structures and hence have difficulties in moldability.

For overcoming the above problem, copolymerization with various bishydroxy compounds has been reported. For example, in copolycarbonates of isosorbide with aromatic bisphenols (Patent Document 3 and Non-Patent Documents 4 to 6), aromatic bisphenols themselves have relatively rigid structures and hence work little to decrease the melt viscosity, and these raw materials have a problem that they are derived from petroleum.

Copolycarbonates of isosorbide with alyphatic diols such as 1,4-butanediol, 1,6-hexanediol, 1,8-octanediol and 1,10-decanediol have been reported (Non-Patent Documents 7 to 8). These polycarbonates are block copolymers or random copolymers, and their glass transition temperatures decrease with an increase the length of the aliphatic chains. It has been observed that the glass transition temperatures thereof are 65° C. or 59° C., 26° C. or 20° C., 12° C. or 23° C., or −1° C. or 7° C., and they are poor in heat resistance.

Further, Patent Document 4 describes a molding material comprising a polycarbonate obtained from isosorbide. Although it is said to have a sufficiently high glass transition temperature over room temperature, further improvements thereof in heat resistance are demanded.

On the other hand, Patent Document 5 proposes a polycarbonate that is a copolycarbonate of the ether diol of the above formula (a) with an aliphatic diol and that has a melt viscosity suitable for relatively easy moldability and also has heat resistance. However, the above proposal has a problem that when the polymerization is carried out under reduced pressure at a high temperature, unreacted aliphatic diol is distilled from the reaction system since the aliphatic diol has a low boiling point, so that the compositional ratio of an obtained polymer differs from the charged ratio. When such an aliphatic diol having a low boiling point is used for the copolymerization, the thermal stability is also sometimes insufficient.

Further, Patent Document 6 discusses the copolymerization of a diol having a specific structure and isosorbide, and the glass transition temperature thereof is 100° C. or higher, while further improvements in heat resistance are demanded.

(Patent Document 1) German Patent Laid-open No. 2938464

(Patent Document 2) International Publication No. 2007/013463

(Patent Document 3) JP 56-110723 A (Patent Document 4) JP 2003-292603 A (Patent Document 5) International Publication No. 2004/111106

(Patent Document 6) JP 2006-232897 A (Non-Patent Document 1) "Journal Fuer Praktische Chemie", 1992, Vol. 334, pp. 298-310

(Non-Patent Document 2) "Macromolecules", 1996, Vol. 29, pp. 8077-8082

(Non-Patent Document 3) "Journal of Applied Polymer Science", 2002, Vol. 86, pp. 872-880

(Non-Patent Document 4) "Macromolecular Chemistry and Physics", 1997, Vol. 198, pp. 2197-2210

(Non-Patent Document 5) "Journal of Polymer Science: Part A", 1997, Vol. 35, pp. 1611-1619

(Non-Patent Document 6) "Journal of Polymer Science: Part A", 1999, Vol. 37, pp. 1125-1133

(Non-Patent Document 7) Okada et al, the proceeding of the seventh open symposium on "Polymers with low environmental loads": Construction of a sustainable material system based on production of plastics with low environmental loads from renewable resources, Scientific Research on Priority Areas (B) supported by Grant-in-Aid for Scientific Research of Ministry of Education, Culture, Sports, Science and Technology, pp. 26-29, 2002

(Non-Patent Document 8) "Journal of Polymer Science: Part A", 2003, Vol. 41, pp. 2312-2321

DISCLOSURE OF THE INVENTION

It is an object of this invention to provide a copolycarbonate that is excellent in heat resistance, thermal stability and moldability and that uses renewable resources as raw materials.

For achieving the above object, the present inventors have made diligent studies, and as a result have found that when the boiling point of an aliphatic diol used in the copolymerization of an ether diol of the following formula (a) and the aliphatic diol is a specific temperature or higher,

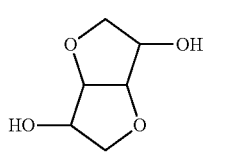
(a)

the resultant copolycarbonate is excellent in heat resistance, thermal stability and moldability, which has led to this invention.

That is, this invention includes the following inventions.

1. A copolycarbonate comprising 50 to 99 mol % of a carbonate constituent unit (1) of the following formula and 50 to 1 mol % of a carbonate constituent unit (2) derived from an aliphatic diol having a boiling point of 180° C. or higher under reduced pressure of $4 \times 10^{-3}$ MPa.

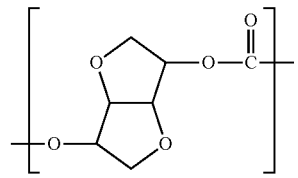
(1)

2. A copolycarbonate as recited in the above 1, wherein the carbonate constituent unit (2) is derived from an aliphatic diol having a boiling point of 190° C. or higher under reduced pressure of $4 \times 10^{-3}$ MPa.

3. A copolycarbonate as recited in the above 1, wherein the carbonate constituent unit (2) is represented by the following formula,

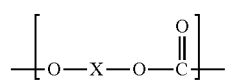
(2)

wherein X is a combination of groups selected from a class consisting of an arenediyl group having 5 to 20 carbon atoms, an alkanediyl group having 1 to 20 carbon atoms, a cycloalkanediyl group having 5 to 20 carbon atoms and an oxygen atom, which has 13 to 30 carbon atoms in total and contains at least one of the alkanediyl group having 1 to 20 carbon atoms or the cycloalkanediyl group having 5 to 20 carbon atoms.

4. A copolycarbonate as recited in the above 3, wherein X is a group represented by the following formula,

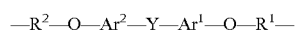
—$R^2$—O—$Ar^2$—Y—$Ar^1$—O—$R^1$— wherein Y is an alkanediyl group having 1 to 20 carbon atoms, a cycloalkanediyl group having 5 to 20 carbon atoms or an arenediyl group having 5 to 20 carbon atoms, $Ar^1$ and $Ar^2$ are the same or different and are each an arenediyl group having 5 to 20 carbon atoms, and $R^1$ and $R^2$ are the same or different and are each an alkanediyl group having 1 to 10 carbon atoms.

5. A copolycarbonate as recited in the above 1, wherein the carbonate constituent unit (1) is a unit derived from isosorbide (1,4:3,6-dianhydro-D-sorbitol).

6. A copolycarbonate as recited in the above 1, wherein the carbonate constituent unit (1) accounts for 85 to 99 mol % based on the total carbonate constituent units.

7. A copolycarbonate as recited in the above 1, wherein a solution of 0.7 g of the copolycarbonate dissolved in 100 ml of methylene chloride at 20° C. has a specific viscosity of 0.18 to 0.65.

8. A copolycarbonate as recited in the above 1, which has a glass transition temperature of 120 to 170° C.

9. A process for producing a copolycarbonate recited in the above 1, which comprises melt-polycondensing an ether diol (a) of the following formula, an aliphatic diol (b) having a boiling point of 180° C. or higher under reduced pressure of $4 \times 10^{-3}$ MPa and a carbonate diester (c) in the presence of at least one polymerization catalyst selected from the group consisting of a nitrogen-containing basic compound, an alkali metal compound and an alkaline earth metal compound under reduced pressure at a temperature of 180 to 280° C.

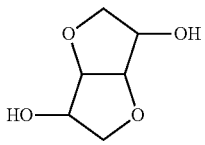

(a)

10. A molded article formed from the copolycarbonate recited in the above 1.

BEST MODE FOR CARRYING OUT THE INVENTION

This invention will be explained in detail hereinafter.
(Carbonate Constituent Unit (1))

The copolycarbonate of this invention comprises a carbonate constituent unit (1) of the following formula.

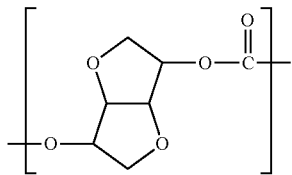

(1)

The carbonate constituent unit (1) is preferably a unit derived from isosorbide (1,4:3,6-dianhydro-D-sorbitol).
(Carbonate Constituent Unit (2))

The copolycarbonate of this invention comprises a carbonate constituent unit (2). The carbonate constituent unit (2) is a unit derived from an aliphatic diol having a boiling point of 180° C. or higher under reduced pressure of $4 \times 10^{-3}$ MPa. The carbonate constituent unit (2) is preferably a unit derived from an aliphatic diol having a boiling point of 190° C. or higher under reduced pressure of $4 \times 10^{-3}$ MPa.

The carbonate constituent unit (2) is preferably a unit represented by the following formula.

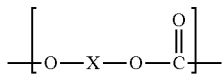

(2)

In the formula (2), X is a combination of groups selected from a class consisting of an arenediyl group (arylene group) having 5 to 20 carbon atoms, an alkanediyl group having 1 to 20 carbon atoms, a cycloalkanediyl group having 5 to 20 carbon atoms and an oxygen atom, which has 13 to 30 carbon atoms in total and contains at least one of the alkanediyl group having 1 to 20 carbon atoms or the cycloalkanediyl group having 5 to 20 carbon atoms.

The arenediyl group having 5 to 20 carbon atoms includes phenylene, naphthalenediyl and fluorenediyl groups.

The alkanediyl group having 1 to 20 carbon atoms includes methylene, ethylene, ethane-1,1-diyl, trimethylene, propanediyl, propane-2,2-diyl, butanediyl, hexanediyl, octanedinyl, nonanediyl, decanediyl, undecanediyl, tridecanediyl, tetradecanediyl and pentadecanediyl groups.

The cycloalkanediyl group having 5 to 20 carbon atoms includes cyclopentylene, cyclohexylene and cyclooctylene groups.

X is preferably a group represented by the following formula,

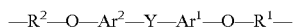

wherein Y is an alkanediyl group having 1 to 20 carbon atoms, a cycloalkanediyl group having 5 to 20 carbon atoms and an arenediyl group having 5 to 20 carbon atoms.

The alkanediyl group having 1 to 20 carbon atoms includes methylene, ethylene, ethane-1,1-diyl, trimethylene, propanediyl, propane-2,2-diyl, butanediyl, hexanediyl, octanediyl, nonanediyl, decanediyl, undecanediyl, tridecanediyl, tetradecanediyl and pentadecanediyl groups.

The cycloalkanediyl group having 5 to 20 carbon atoms includes cyclopentylene, cyclohexylene and cyclooctylene groups.

The arenediyl group having 5 to 20 carbon atoms includes fluorenediyl group.

$Ar^1$ and $Ar^2$ are the same or different from each other, and each of them is an arenediyl group (arylene group) having 5 to 20 carbon atoms. The arenediyl group having 5 to 20 carbon atoms includes phenylene, naphthalenediyl and fluorenediyl groups. These may be substituted with an alkyl group having 1 to 6 carbon atoms or a halogen atom.

$R^1$ and $R^2$ are the same or different from each other, and each of them is an alkanediyl group having 1 to 10 carbon atoms. The alkanediyl group having 1 to 10 carbon atoms includes methylene, ethylene, trimethylene, butylene, hexylene, octylene, nonylene and decylene groups.
(Copolymerization Ratio)

The content of the carbonate constituent unit (1) in the copolycarbonate of this invention is 50 to 99 mol %, preferably 85 to 99 mol %, more preferably 85 to 95 mol %. The content of the carbonate constituent unit (2) is 50 to 1 mol %, preferably 15 to 1 mol %, more preferably 15 to 5 mol %. When the content of the carbonate constituent unit (1) is greater than 99 mol %, the effect of the carbonate constituent unit (2) on the decreasing of the melt viscosity is no longer observed. When the content of the carbonate constituent unit (1) is smaller than 50 mol %, the moldability is improved, but the heat resistance decreases, and it becomes difficult to satisfy the object of "a polycarbonate using raw materials derived from renewable resources such as plants" that is originally intended. The copolycarbonate of this invention may contain other carbonate constituent unit than the units (1) and (2) so long as the object of this invention is not impaired.
(Physical Properties)

In the copolycarbonate of this invention, a solution of 0.7 g thereof dissolved in 100 ml of methylene chloride at 20° C. has a specific viscosity of 0.18 to 0.65. The lower limit of the specific viscosity is preferably 0.18, more preferably 0.20, still more preferably 0.22. The upper limit of the specific viscosity is preferably 0.65, more preferably 0.55, still more preferably 0.45. When the specific viscosity is lower than 0.18, it is difficult to impart sufficient mechanical strength to a molded article obtained from the copolycarbonate of this invention. When the specific viscosity is higher than 0.65, the melt flowability becomes too high, and the melting temperature providing flowability necessary for molding becomes higher than the decomposition temperature.

The melt-viscosity of the copolycarbonate of this invention, measured with a capillary rheometer at 250° C. under the condition of a shear rate of 600 $sec^{-1}$ is preferably within the range of $0.2 \times 10^3$ to $5.0 \times 10^3$ Pa·s, more preferably $0.4 \times 10^3$ to $5.0 \times 10^3$, still more preferably, $0.4 \times 10^3$ to $3.0 \times 10^3$. When the melt-viscosity within the above range, a molded article is excellent in mechanical strength, and when the copolycarbonate of this invention is used for molding, a molded article becomes excellent because of no occurrence of silver.

The glass transition temperature (Tg) of the copolycarbonate of this invention is preferably 120 to 170° C. The lower limit of the Tg is preferably 120° C., more preferably 130° C. The upper limit of the Tg is preferably 170° C., more preferably 165° C. When the Tg is lower than 120° C., the copolycarbonate is poor in heat resistance. When it exceeds 170° C., the melt flowability is poor when the copolycarbonate of this invention is used for molding. The Tg is measured with DSC (model DSC2910) supplied by TA Instruments Inc.

(Production of Copolycarbonate)

The copolycarbonate of this invention can be produced by melt-polycondensing an ether diol (a) of the following formula, an aliphatic diol (b) having a boiling point of 180° C. or higher under reduced pressure of $4 \times 10^{-3}$ MPa and a carbonate diester (c) in the presence of at least one polymerization catalyst selected from the group consisting of a nitrogen-containing basic compound, an alkali metal compound and an alkaline earth metal compound under reduced pressure at a temperature of 180 to 280° C.

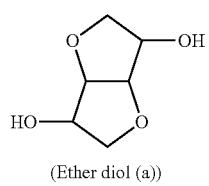

(Ether diol (a))

The ether diol (a) specifically includes isosorbide, isomannide and isoidide represented by the following formulae (a-1), (a-2) and (a-3).

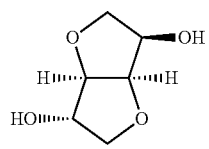

(a-1)

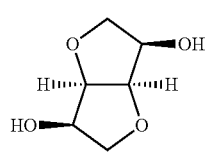

(a-2)

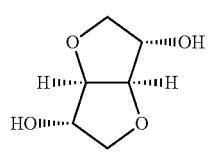

(a-3)

These ether diols derived from glycides are substances that are also obtained from biomass in nature and are ones called renewable resources. Isosorbide is obtained by hydrogenating D-glucose obtained from starch and then subjecting it to dehydration. The other ether diols are also obtained by the same reactions except for starting materials. In particular, the ether diol (a) is preferably isosorbide (1,4:3,6-dianhydro-D-sorbitol). Isosorbide is an ether diol that can be easily produced from starch, etc., and is abundantly available as a resource, and it is excellent over isomannide and isoidide in all of easiness in production, property and broadness in use.

(Aliphatic Diol (b))

The aliphatic diol (b) used for producing the copolycarbonate of this invention has a boiling point of 180° C. or higher, preferably 190° C. or higher, under reduced pressure of $4 \times 10^{-3}$ PMa. The upper limit thereof is not specially limited, while it is sufficiently 500° C. or lower. When the boiling point of the aliphatic diol (b) is 180° C. or higher, there is not involved any problem that the compositional ratio of an obtained polymer deviates from the changing ratio, which is caused by the aliphatic diol (b) being distilled from the reaction system when the copolycarbonate is polymerized, and the copolycarbonate obtained is excellent in heat resistance, thermal stability and moldability.

The above aliphatic diol (b) includes, for example, an aliphatic diol having a structure represented by the following formula (3).

$$HO-X-OH \qquad (3)$$

In the formula (3), X is as defined in the formula (2).

Specific examples of the aliphatic diol (b) include 2,2-bis-(4-hydroxycyclohexyl)-propane, 1,14-tetradecanediol, octaethylene glycol, 1,16-hexadecanediol, 4,4'-bis(2-hydroxyethoxy)biphenyl, bis{4-(2-hydroxyethoxy)phenyl}methane, 1,1-bis{4-(2-hydroxyethoxy)phenyl}ethane, 1,1-bis{4-(2-hydroxyethoxy)phenyl}-1-phenylethane, 2,2-bis{4-(2-hydroxyethoxy)phenyl}propane, 2,2-bis{4-(2-hydroxyethoxy)-3-methylphenyl}propane, 1,1-bis{4-(2-hydroxyethoxy)phenyl}-3,3,5-trimethylcyclohexane, 2,2-bis{4-(2-hydroxyethoxy)-3,3'-biphenyl}propane, 2,2-bis{4-(2-hydroxyethoxy)-3-isopropylphenyl}propane, 2,2-bis{3-tert-butyl-4-(2-hydroxyethoxy)phenyl}propane, 2,2-bis{4-(2-hydroxyethoxy)phenyl}butane, 2,2-bis{4-(2-hydroxyethoxy)phenyl}-4-methylpentane, 2,2-bis{4-(2-hydroxyethoxy)phenyl}octane, 1,1-bis{4-(2-hydroxyethoxy)phenyl}decane, 2,2-bis{3-bromo-4-(2-hydroxyethoxy)phenyl}propane, 2,2-bis{3,5-dimethyl-4-(2-hydroxyethoxy)phenyl}propane, 2,2-bis{3-cyclohexyl-4-(2-hydroxyethoxy)phenyl}propane, 1,1-bis{3-cyclohexyl-4-(2-hydroxyethoxy)phenyl}cyclohexane, bis{4-(2-hydroxyethoxy)phenyl}diphenylmethane, 9,9-bis{4-(2-hydroxyethoxy)phenyl}fluorene, 9,9-bis{4-(2-hydroxyethoxy)-3-methylphenyl}fluorene, 1,1-bis{4-(2-hydroxyethoxy)phenyl}cyclopentane, 4,4'-bis(2-hydroxyethoxy)diphenyl ether, 4,4'-bis(2-hydroxyethoxy)-3,3'-dimethyldiphenyl ether, 1,3-bis[2-{4-(2-hydroxyethoxy)phenyl}propyl]benzene, 1,4-bis[2-{4-(2-hydroxyethoxy)phenyl}propyl]benzene, 1,4-bis{4-(2-hydroxyethoxy)phenyl}cyclohexane, 1,3-bis{4-(2-hydroxyethoxy)phenyl}cyclohexane, 4,8-bis{(2-hydroxyethoxy)phenyl}tricyclo[5.2.1.0$^{2,6}$]decane, 1,3-bis{4-(2-hydroxyethoxy)phenyl}-5,7-dimethyladamantane, 1,1-bis{4-(2-hydroxyethoxy)phenyl}cyclohexane, and a terpene dimethylol compound such as a compound of the following formula (4).

(4)

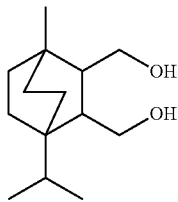

Above all, 2,2-bis-(4-hydroxycyclohexyl)-propane, 1,14-tetradecanediol, 1,16-hexadecanediol, 4,4'-bis(2-hydroxyethoxy)biphenyl, bis{4-(2-hydroxyethoxy)phenyl}methane, 1,1-bis{4-(2-hydroxyethoxy)phenyl}ethane, 1,1-bis{4-(2-hydroxyethoxy)phenyl}-1-phenylethane, 2,2-bis{4-(2-hydroxyethoxy)phenyl}propane, 2,2-bis{4-(2-hydroxyethoxy)-3-methylphenyl}propane, 1,1-bis{4-(2-hydroxyethoxy)phenyl}-3,3,5-trimethylcyclohexane, 2,2-bis{4-(2-hydroxyethoxy)phenyl}butane, 2,2-bis{4-(2-hydroxyethoxy)phenyl}-4-methylpentane, 2,2-bis{4-(2-hydroxyethoxy)phenyl}octane, 1,1-bis{4-(2-hydroxyethoxy)phenyl}decane, 9,9-bis{4-(2-hydroxyethoxy)phenyl}fluorene, 1,3-bis[2-{4-(2-hydroxyethoxy)phenyl}propyl]benzene, 1,4-bis[2-{4-(2-hydroxyethoxy)phenyl}propyl]benzene, 1,3-bis{4-(2-hydroxyethoxy)phenyl}-5,7-dimethyladamantane, 1,1-bis{4-(2-hydroxyethoxy)phenyl}cyclohexane and a compound of the above formula (4) are preferred.

Especially, 2,2-bis-(4-hydroxycyclohexyl)-propane <<193° C.>>, 1,14-tetradecanediol <<195° C.>>, 1,16-hexadecanediol <<208° C.>>, 4,4'-bis(2-hydroxyethoxy)biphenyl <<211° C.>>, 2,2-bis{4-(2-hydroxyethoxy)phenyl}propane <<249° C.>>, 2,2-bis{4-(2-hydroxyethoxy)phenyl}-4-methylpentane << >250° C.>>, 1,1-bis{4-(2-hydroxyethoxy)phenyl}decane << >250° C.>>, 9,9-bis{4-(2-hydroxyethoxy)phenyl}fluorene << >250° C.>>, 1,3-bis[2-{4-(2-hydroxyethoxy)phenyl}propyl]benzene << >250° C.>>, 1,1-bis{4-(2-hydroxyethoxy)phenyl}cyclohexane << >250° C.>> and a compound of the above formula (4)<< >180° C.>> are preferred. Further, these may be used singly or in combination of two or more of them. A temperature inside << >> in the above examples is a boiling point under $4 \times 10^{-3}$ MPa.

The copolycarbonate of this invention can be obtained by carrying out melt-polymerization in the presence of the polymerization catalyst, wherein the ether diol, the aliphatic diol and the carbonate diester are mixed and the mixture is subjected to an ester exchange reaction while formed alcohol or phenol is distilling off at a high temperature under reduced pressure.

For the reaction temperature, it is preferred to employ the condition under which the temperature is the lowest possible, for preventing the decomposition of the ether diol and the aliphatic diol and obtaining a resin that is less colored and has a high viscosity. For proceeding with the polymerization reaction properly, the polymerization temperature is preferably within the range of 180 to 280° C., more preferably within the range of 230° C. to 270° C.

In the initial stage of the reaction, it is preferred to employ a method in which the ether diol (a), the aliphatic diol (b) and the carbonate diester (c) are heated under atmospheric pressure to react them for a preliminary reaction, and then the reaction system is gradually pressure-reduced to approximately $1.3 \times 10^{-3}$ to $1.3 \times 10^{-5}$ MPa in the latter stage to make it easier to distill off the formed alcohol or phenol. The reaction time period is normally about 1 to 4 hours.

For expediting the polymerization speed, it is preferred to use a polymerization catalyst. The polymerization catalyst includes alkali metal compounds such as sodium hydroxide, potassium hydroxide, sodium carbonate, potassium carbonate, sodium hydrogen carbonate, and a sodium salt or potassium salt of dihydric phenol. It also includes alkaline earth metal compounds such as calcium hydride, barium hydroxide and magnesium hydroxide. Further, it also includes nitrogen-containing basic compounds such as tetramethylammonium hydroxide, tetraethylammonium hydroxide, tetrabutylammonium hydroxide, trimethylamine and triethylamine. These may be used singly or in combination of two or more of them. Above all, it is preferred to use a nitrogen-containing basic compound and an alkali metal compound in combination.

The amount of the polymerization catalyst for use per mole of the carbonate diester is preferably within the range of $1 \times 10^{-9}$ to $1 \times 10^{-3}$ equivalent weight, more preferably $1 \times 10^{-8}$ to $5 \times 10^{-4}$ equivalent weight. It is preferred to maintain the reaction system in an atmosphere of a gas inert to the raw materials, the reaction mixture and the reaction product, such as nitrogen. The inert gas other than nitrogen includes argon. Further, an additive such as an antioxidant may be added as required.

The carbonate diester (c) used for producing the copolycarbonate of this invention includes esters of an aryl group that has 6 to 20 carbon atoms and may be substituted, an aralkyl group and an alkyl group that has 1 to 18 carbon atoms and may be substituted. Specifically, it includes diphenyl carbonate, bis(chlorophenyl)carbonate, m-cresyl carbonate, dinaphthyl carbonate, bis(p-butylphenyl)carbonate, dimethyl carbonate, diethyl carbonate and dibutyl carbonate. Of these, diphenyl carbonate is preferred.

The carbonate diester (c) is mixed preferably such that the molar ratio thereof to the total amount of the ether diol compound and the bisphenol is 1.05 to 0.97, more preferably, 1.03 to 0.98, still more preferably, 1.03 to 0.99. When the molar ratio of the carbonate diester is larger than 1.05, undesirably, a carbonate ester residue works as a terminal stopper, and a sufficient polymerization degree cannot be obtained any longer. When the molar ratio of the carbonate diester is smaller than 0.97, undesirably, a sufficient polymerization degree cannot be obtained any longer, either.

A catalyst deactivator can be added to the copolycarbonate obtained by the above process. As a catalyst deactivator, known catalyst deactivators are effectively used. Of these, ammonium salt and phosphonium salt of sulfonic acid are preferred, and the above salts of dodecylbenzene sulfonic acid such as dodecylbenzenesulfonic acid tetrabutylphosphonium salt and the above salts of p-toluenesulfonic acid such as p-toluenesulfonic acid tetrabutylammonium salt are further preferred. Further, esters of sulfonic acids such as methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate and phenyl p-toluenesulfonate are preferably used, and of these, dodecylbenzenesulfonic acid tetrabutylphosphonium salt is the most preferably used. The amount of the catalyst deactivator that can be used per mole of the above polymerization catalyst selected from the alkali metal compound and/or the alkaline earth metal compound is 0.5 to 50 mol, preferably 0.5 to 10 mol, more preferably 0.8 to 5 mol.

The copolycarbonate of this invention may contain various function-imparting agents depending upon use, and examples thereof include a thermal stabilizer, a stabilization aids, a plasticizer, an antioxidant, a light stabilizer, an impact-absorbing agent, a heavy metal deactivator, a flame retardant, a lubricant, an antistatic agent and an ultraviolet absorbent.

The copolycarbonate of this invention may contain a composite material of various organic and inorganic fillers and fibers, depending upon use. Examples of the filler include carbon, talc, mica, wollastonite, montmorillonite and hydrotalcite. Further, examples of the fiber include natural fibers such as kenaf and other various synthetic fibers, glass fibers, quartz fibers and carbon fibers.

Further, the copolycarbonate of this invention may be mixed with plant-derived polymers, synthetic resins and rubbers such as polylactic acid, aliphatic polyester, aromatic polyester, aromatic polycarbonate, polyamide, polystyrene, polyolefin, polyacryl, ABS and polyurethane, and may be used as alloys.

This invention includes a molded article formed from the copolycarbonate of this invention.

EXAMPLES

This invention will be further explained with reference to Examples hereinafter, while this invention shall not be limited by these Examples. In Examples, "part" stands for "part by weight", and "%", for "% by weight". Evaluations were made according to the following methods.
(1) Specific Viscosity ($\eta_{sp}$)

Pellets were dissolved in methylene chloride to form a solution having a concentration of about 0.7 g/dL, and the solution was measured with an Ostwald viscometer (apparatus name: RIGO AUTO VISCOSIMETER TYPE VMR-0525·PC) at 20° C. A specific viscosity ($\eta_{sp}$) was determined on the basis of the following expression.

$\eta_{sp}=t/t_0-1$ t: A flow time of a sample solution
$t_0$: A flow time of a solvent alone
(2) Glass Transition Temperature (Tg)

It was measured by using pellets with DSC (model DSC2910) supplied by TA Instruments Inc.
(3) Moldability A sample plate having a thickness of 2 mm, molded with JSWJ-75EIII supplied by Japan Steel Works, Ltd. (mold temperature: 70-90° C., molding temperature: 220-260° C.), was visually evaluated. The evaluation ratings are as follows.

○; No silver caused by turbidity, breaking, sinking and decomposition was observed.

X; Silver caused by turbidity, breaking, sinking or decomposition was observed.

Example 1

A reactor was charged with 1,447 parts by weight (9.9 mol) of isosorbide, 253 parts by weight (1.1 mol) of 1,14-tetradecanediol and 2,427 parts by weight (11.33 mol) of diphenyl carbonate, and 2.1 parts by weight ($2\times10^{-4}$ mol per mole of diphenyl carbonate) of tetramethylammonium hydroxide and $1.1\times10^{-2}$ parts by weight ($2.5\times10^{-6}$ mol per mole of diphenyl carbonate) of sodium hydroxide was charged as polymerization catalysts, followed by melting at 180° C. under a nitrogen atmosphere. While they were stirred, the inside of the reactor was pressure-reduced to $13.3\times10^{-3}$ MPa, and they were allowed to react for 20 minutes with distilling off formed phenol. Then, the temperature was increased to 200° C., and then the pressure was gradually reduced, followed by a reaction at $4.0\times10^{-3}$ MPa for 25 minutes with distilling phenol off, and the temperature was increased to 220° C., followed by a reaction for 10 minutes. Then, the pressure was gradually reduced, and the reaction was continued at $2.67\times10^{-3}$ MPa for 10 minutes and at $1.33\times10^{-3}$ MPa for 10 minutes. The pressure was further reduced, and when it came to $4.00\times10^{-5}$ MPa, the temperature was gradually increased up to 260° C., followed by a final reaction at 260° C. at $6.66\times10^{-5}$ MPa for 2 hours. A polymer after the reaction was pelletized. The polymer had a specific viscosity of 0.28 and a glass transition temperature of 139° C. When a molding was done by using the polymer, the polymer showed excellent moldability.

Example 2

A polymer in the form of pellets was obtained by carrying out polymerization in the same manner as in Example 1 except that 965 parts by weight (6.6 mol) of isosorbide and 1,392 parts by weight (4.4 mol) of 2,2-bis-(4-hydroxycyclohexyl)-propane were used. The polymer had a specific viscosity of 0.31 and a glass transition temperature of 145° C. When a molding was done by using the polymer, the polymer showed excellent moldability.

Example 3

A polymer in the form of pellets was obtained by carrying out polymerization in the same manner as in Example 1 except that 804 parts by weight (5.5 mol) of isosorbide and 2,412 parts by weight (5.5 mol) of 9,9-bis-{4-(2-hydroxyethoxy)phenyl}fluorene were used. The polymer had a specific viscosity of 0.29 and a glass transition temperature of 157° C. When a molding was done by using the polymer, the polymer showed excellent moldability.

Example 4

A polymer in the form of pellets was obtained by carrying out polymerization in the same manner as in Example 1 except that 1,446 parts by weight (10.89 mol) of isosorbide and 28 parts by weight (0.11 mol) of a compound of the following formula (4) were used.

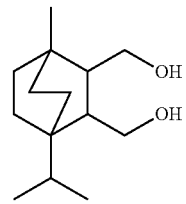

(4)

The polymer had a specific viscosity of 0.27 and a glass transition temperature of 160° C. When a molding was done by using the polymer, the polymer showed excellent moldability.

Example 5

A polymer in the form of pellets was obtained by carrying out polymerization in the same manner as in Example 1 except that 1,446 parts by weight (10.89 mol) of isosorbide and 35 parts by weight (0.11 mol) of 2,2-bis-{4-(2-hydroxyethoxy)phenyl}propane were used. The polymer had a specific viscosity of 0.29 and a glass transition temperature of 140° C. When a molding was done by using the polymer, the polymer showed excellent moldability.

Example 6

A polymer in the form of pellets was obtained by carrying out polymerization in the same manner as in Example 1 except that 1,447 parts by weight (9.9 mol) of isosorbide and 392 parts by weight (1.1 mol) of 1,1-bis-{4-(2-hydroxyethoxy)phenyl}cyclohexane were used. The polymer had a specific viscosity of 0.29 and a glass transition temperature of 143° C. When a molding was done by using the polymer, the polymer showed excellent moldability.

Example 7

A polymer in the form of pellets was obtained by carrying out polymerization in the same manner as in Example 1 except that 1,447 parts by weight (9.9 mol) of isosorbide and 456 parts by weight (1.1 mol) of 1,1-bis-{4-(2-hydroxyethoxy)phenyl}decane were used. The polymer had a specific viscosity of 0.28 and a glass transition temperature of 130° C. When a molding was done by using the polymer, the polymer showed excellent moldability.

Example 8

A polymer in the form of pellets was obtained by carrying out polymerization in the same manner as in Example 1 except that 1,447 parts by weight (9.9 mol) of isosorbide and 394 parts by weight (1.1 mol) of 2,2-bis-{4-(2-hydroxyethoxy)phenyl}-4-methylpentane were used. The polymer had a specific viscosity of 0.29 and a glass transition temperature of 138° C. When a molding was done by using the polymer, the polymer showed excellent moldability.

Comparative Example 1

A reactor having a thermometer and a stirrer was charged with 1,590 parts by weight (10.88 mol) of isosorbide and 39 parts by weight (0.26 mol) of p-tert-butylphenol, and after the atmosphere inside it was replaced with nitrogen, 5,500 parts by weight of pyridine that was dried well beforehand and 32,400 parts by weight of methylene chloride were added to dissolve them. With stirring, 1,400 parts by weight (14.14 mol) of phosgene was introduced at 25° C. by blowing over a time period of 100 minutes. After completion of the introduction by blowing, the obtained reaction mixture was stirred for about 20 minutes to complete the reaction. After completion of the reaction, the obtained product was diluted with methylene chloride and pyridine was neutralized with hydrochloric acid to remove it, then, the reaction mixture was washed with water repeatedly until its conductivity became equal to that of deionized water, and then methylene chloride was evaporated off to give a colorless powder. The powder was pelletized. The polymer had a specific viscosity of 0.43 and a glass transition temperature of 169° C. When the polymer was molded, the polymer was poor in moldability since it was poor in flowability and since a sink mark and silver were observed in a molded article.

Comparative Example 2

A polymer was obtained by carrying out polymerization in the same manner as in Example 1 except that 1,125 parts by weight (7.7 mol) and 251 parts by weight (3.3 mol) of 1,3-propanediol were used in place. The polymer had a specific viscosity of 0.15 and a glass transition temperature of 112° C. With regard to the molar ratio of the diol components when they were charged, it was isosorbide/propanediol=70/30. When the compositional ratio of the polymer was calculated on the basis of an integral value of $^1$HNMR, it was isosorbide/propanediol=81/19. This compositional ratio of the polymer was deviated from the charging ratio. Further, since the propanediol component was distilled off, the diol component and the diphenyl carbonate component became imbalanced, so that not any polymer having a sufficient specific viscosity (molecular weight) could be obtained.

Table 1 shows the results of Examples 1 to 8 and Comparative Examples 1 to 2.

TABLE 1

| | | | Ex. 1 | Ex. 2 | Ex. 3 | Ex. 4 | Ex. 5 | Ex. 6 | Ex. 7 | Ex. 8 | C. Ex. 1 | C. Ex. 2 |
|---|---|---|---|---|---|---|---|---|---|---|---|---|
| Composition | Isosorbide | Molar ratio | 90 | 60 | 50 | 99 | 90 | 90 | 90 | 90 | 100 | 70 |
| | Aliphatic diol | Molar ratio | 10 | 40 | 50 | 1 | 10 | 10 | 10 | 10 | 0 | 30 |
| Evaluations of physical properties | Specific viscosity | | 0.28 | 0.31 | 0.29 | 0.27 | 0.29 | 0.29 | 0.28 | 0.29 | 0.43 | 0.15 |
| | Tg | ° C. | 139 | 145 | 157 | 160 | 140 | 143 | 130 | 138 | 169 | 112 |
| | Moldability | | ○ | ○ | ○ | ○ | ○ | ○ | ○ | ○ | X (sink mark, silver) | Not moldable |

Ex.: Example
C. Ex.: Comparative Example

EFFECT OF THE INVENTION

The copolycarbonate of this invention has units derived from renewable resources, has good heat resistance and thermal stability and is also excellent in moldability. The copolycarbonate of this invention can be therefore used widely in various fields including optical parts such as an optical sheet, an optical disc, an information disc, an optical lens and a prism, various mechanical parts, construction materials, automobile parts, various resin trays and tableware.

The copolycarbonate of this invention also has biodegradability and hence can be also used as molded articles in various use fields where it is desired to decrease environmental pollution. For example, it can be used as films for agricultural materials such as a film for a greenhouse and a mulching film, packaging films such as a sheet, a food packaging film, a general packaging film and a compost bag, industrial products such as a sheet and a tape, and various packing vessels or containers.

The invention claimed is:

1. A copolycarbonate comprising 50 to 99 mol % of a carbonate constituent unit (1) of the following formula and 50 to 1 mol % of a carbonate constituent unit (2) of the following formula having a boiling point of 180° C. or higher under reduced pressure of 4×10⁻³ MPa

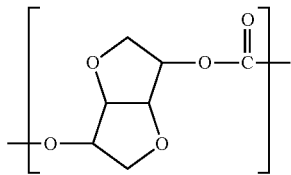
(1)

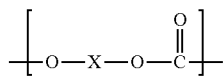
(2)

wherein X is a group of the following formula (4)

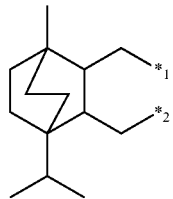
(4)

wherein *1 and *2 are parts where they form bonds to oxygen of unit (2) respectively, or a group represented by the following formula,

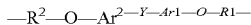

wherein Y is an alkanediyl group having 1 to 20 carbon atoms, a cyclohexylene group or a fluorenediyl group, $Ar^1$ and $Ar^2$ are a phenylene group respectively, and $R^1$ and $R^2$ are an ethylene group respectively.

2. A copolycarbonate as recited in claim 1, wherein the carbonate constituent unit (1) is a unit derived from isosorbide (1,4:3,6-dianhydro-D-sorbitol).

3. A copolycarbonate as recited in claim 1, wherein the carbonate constituent unit (1) accounts for 85 to 99 mol % based on the total carbonate constituent units.

4. A copolycarbonate as recited in claim 1, wherein a solution of 0.7 g of the copolycarbonate dissolved in 100 ml of methylene chloride at 20° C. has a specific viscosity of 0.18 to 0.65.

5. A copolycarbonate as recited in claim 1, which has a glass transition temperature of 120 to 170° C.

6. A process for producing a copolycarbonate recited in claim 1, which comprises melt-polycondensing an ether diol (a) of the following formula, a diol (b) having a boiling point of 180° C. or higher under reduced pressure of 4×10⁻³ MPa and a carbonate diester (c) in the presence of at least one polymerization catalyst selected from the group consisting of a nitrogen-containing basic compound, an alkali metal compound and an alkaline earth metal compound under reduced pressure at a temperature of 180 to 280° C.

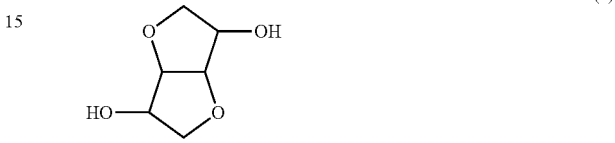
(a)

wherein the diol (b) has the following formula (3),

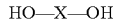
(3)

wherein X is a group of the following formula (4)

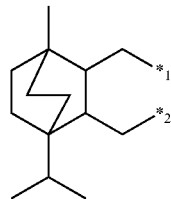
(4)

wherein *1 and *2 are parts where they form bonds to oxygen of formula (3) respectively, or a group represented by the following formula,

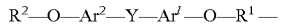

wherein Y is an alkanediyl group having 1 to 20 carbon atoms, a cyclohexylene group or a fluorenediyl group, $Ar^1$ and $Ar^2$ are a phenylene group respectively, and $R^1$ and $R^2$ are an ethylene group respectively.

7. A molded article formed from the copolycarbonate recited in claim 1.

* * * * *